United States Patent
Marks et al.

(10) Patent No.: US 10,929,100 B2
(45) Date of Patent: Feb. 23, 2021

(54) MITIGATING CAUSALITY DISCREPANCIES CAUSED BY STALE VERSIONING

(71) Applicant: EMC IP Holding Company LLC, Hopkinton, MA (US)

(72) Inventors: Raeanne Marks, Seattle, WA (US); Jason Vigil, Denver, CO (US); Tanuj Khurana, New Dehli (IN)

(73) Assignee: EMC IP Holding Company LLC, Hopkinton, MA (US)

(*) Notice: Subject to any disclaimer, the term of this patent is extended or adjusted under 35 U.S.C. 154(b) by 151 days.

(21) Appl. No.: 16/124,632

(22) Filed: Sep. 7, 2018

(65) Prior Publication Data
US 2019/0079726 A1    Mar. 14, 2019

Related U.S. Application Data

(60) Provisional application No. 62/555,733, filed on Sep. 7, 2017.

(51) Int. Cl.
*G06F 7/08* (2006.01)
*G06F 16/17* (2019.01)
*G06F 16/901* (2019.01)

(52) U.S. Cl.
CPC ............ *G06F 7/08* (2013.01); *G06F 16/1734* (2019.01); *G06F 16/9024* (2019.01)

(58) Field of Classification Search
None
See application file for complete search history.

(56) References Cited

U.S. PATENT DOCUMENTS 8,661,063 B2* 2/2014 Mason, Jr. .......... G06F 16/1774
                                                     707/802

OTHER PUBLICATIONS

Wong et al. ACM. Detecting Software Modularity Violations, May 2011.*

* cited by examiner

*Primary Examiner* — Tuankhanh D Phan
(74) *Attorney, Agent, or Firm* — Krishnendu Gupta; Nikhil Patel

(57) ABSTRACT

Implementations are provided herein for causally ordering events within a distributed file system. Each node within the distributed file system, when processing an event, can collect object/version pairs associated with event (e.g., an object identifier and an object version number of the object at the time of the event). Object/version pairs can be identified and labeled as reliable or unreliable based on the operation performed on the inode as a part of the event. Relationships between events can be established when two events modify the same object and one event has a lower revision number. If the two object/revision pairs are in a relationship, an unreliable relationship can be deemed a weak edge and a reliable relationship can be deemed a strong edge. Using the strong and weak edges associated with object/revision pairs, a causal order of events can be generated.

15 Claims, 9 Drawing Sheets

| EVENT TRANSACTION LOG # | Viewed Inode and Inode Revision Number Pairs | Modified Inode and Inode revision Number Pairs | EVENT |
| --- | --- | --- | --- |
| 1 | ('/', 2) | (a,3) (b,3) | Rename /a/c -> /b/d |
| 2 | ('/',2) | (b,4) | Delete /b/d |
| 3 | None | ('/', 2) | Chmod / |
| 4 | ('/',2) (a,2) | (c,3) | Append /a/c |
| 5 | ('/',1) | (a,2) | Create /a/c |

| INODE MAP |||
| --- | --- | --- |
| Inode | Revision Number | Event Identifiers |
| IN ('/') | 1 | 5 |
| | 2 | 1, 2, 3, 4 |
| IN (a) | 2 | 4, 5 |
| | 3 | 1 |
| IN (b) | 3 | 1 |
| | 4 | 2 |
| IN (c) | 3 | 4 |
| IN (d) | 3 | 4 |

FIG. 3

BEFORE RELATIONSHIPS

AFTER RELATIONSHIPS

MITIGATING CAUSALITY DISCREPANCIES CAUSED BY STALE VERSIONING

CROSS REFERENCE TO RELATED APPLICATIONS

This applications claims the benefit of U.S. Provisional Application No. 62/555,733 filed Sep. 8, 2017.

This application is related to co-pending U.S. patent application Ser. No. 15/581,305 for CAUSALLY ORDERING DISTRIBUTED FILE SYSTEM EVENTS and co-pending U.S. patent application Ser. No. 15/197,673 for LOAD BALANCING HADOOP DISTRIBUTED FILE SYSTEM OPERATIONS IN A NON-NATIVE OPERATING SYSTEM, which are incorporated herein by reference for all purposes.

FIELD OF THE INVENTION

This invention relates generally to processing data, and more particularly to causally ordering distributed file system events using inode revision numbers.

BACKGROUND OF THE INVENTION

Distributed file systems offer many compelling advantages in establishing high performance computing environments. One example is the ability to easily expand, even at large scale. Another example is the ability to store different types of data, accessible by different types of clients, using different protocols. A distributed file system can operate on a cluster of nodes, allowing clients to connect to any node of the cluster to access and/or modify data residing on any node of the cluster.

Events within the file system can create a new file, change permissions on a file, change the metadata of a file, etc. These events can happen in parallel and can be processed on different nodes of the cluster of nodes. The distributed file system may have in place locking mechanisms that prevent access to a file while it is being modified by another user or file system process. However, as events are processed that change the metadata on files, it is desirable to know a causal order of the actions that have been processed, no matter which node is processing the individual events.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, an event transaction log can be maintained, wherein events in the event transaction log or associated with an event identifier and each event includes a set of viewed inode number and inode revision number pairs and a set of modified inode number and inode revision number pairs. An inode map can be generated based on the event transaction log, wherein the inode map maps event identifiers to inode revision numbers associated with each inode number referenced in the event transaction log. A directed acyclic graph can be generated based on the inode map and the event transaction log, wherein a vertex in the directed acyclic graph represents an event identifier and an edge in the directed acyclic graph represents a causal relationship. Events in the event transaction log can be causally ordered based on a topological sort of the directed acyclic graph.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

FIG. 3 illustrates an example inode map in accordance with implementations of this disclosure;

DETAILED DESCRIPTION

Figure 1:
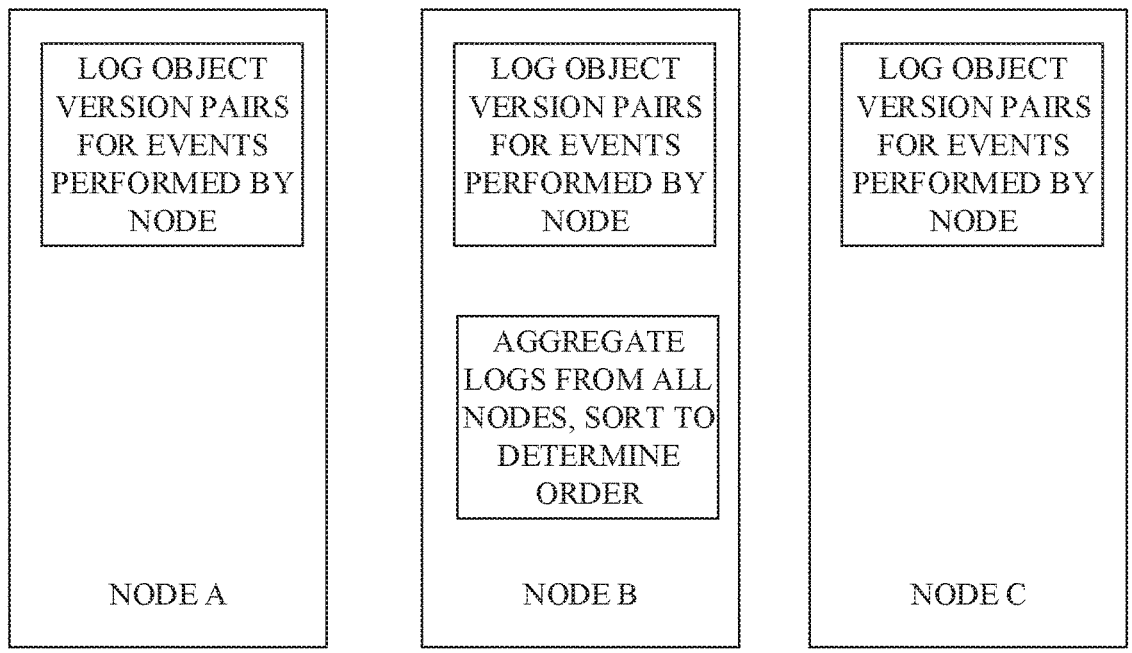
FIG. 1 illustrates an example illustration of a cluster of nodes logging object/version pairs in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As used herein, the term "node" refers to a physical computing device, including, but not limited to, network devices, servers, processors, cloud architectures, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode number "LIN" mappings that reference unique inodes that contain the physical location(s) of the data stored within the file system. For example, processes can use unique LIN's to reference the associated inode that can contain a data tree that maps the logical block numbers to the actual physical location(s) of the block file data for a file within the file system. In one implementation, nodes among the cluster of nodes run a common operating system kernel. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

The term "inode" as used herein refers to either an in-memory representation or an on-disk data structure that can store information, or meta-data, about files and directories, such as file size, file ownership, access mode (read, write, execute permissions), time and date of creation and modification, file types, data protection process information such as encryption and/or compression information, snapshot information, hash values associated with location of the file, mappings to cloud data objects, pointers to a cloud metadata objects, etc. In one implementation, inodes may be in a known location in a file system, for example, residing in cache memory for fast and/or efficient access by the file system. In accordance with implementations disclosed herein, inodes can be associated with an inode revision number that is incremented in real time as the inode is modified. The inode revision number can also be referred to as a version number in an object/version pair. As discussed herein, inodes can be referred to by their LIN because the LIN is a unique identifier for that inode. It can be appreciated that the LIN is only one field in an inode.

In some implementations, a data structure explicitly named "inode" and/or LIN's may be absent, but file systems may have data structures that store data similar to inodes and may provide capabilities similar to inodes as described herein. It can be appreciated that the concepts and implementations as provided herein are functional using data structures not termed inodes but that offer the same functionality to the file system.

Implementations are provided herein for causally ordering events within a distributed file system. Each node within the distributed file system, when processing an event, can collect object/version pairs associated with event (e.g., an object identifier and an object version number of the object at the time of the event). Object/version pairs can be identified and labeled as reliable or unreliable based on the operation performed on the inode as a part of the event. Relationships between events can be established when two events modify the same object and one event has a lower revision number. If the two object/revision pairs are in a relationship, an unreliable relationship can be deemed a weak edge and a reliable relationship can be deemed a strong edge. Using the strong and weak edges associated with object/revision pairs, a causal order of events can be generated.

Inode revision numbers can be associated with an inode. Any time an inode is changed, its inode revision number can be incremented by 1.

In one implementation, at least two of the causally ordered events can be processed in parallel on at least two different nodes among the cluster of nodes operating as a distributed file system.

In one implementation, any file system event that makes changes to LIN metadata can be causally ordered. It can be appreciated that those events can include changing permissions, changing ownership, setting times, creating a file/directory, deleting a file/directory, renaming a file/directory, an append, etc.

In one implementation, a causally ordered list of transactions can be assigned sequential transactions numbers and be made available to external services. It can be appreciated that the external services can be iNotify, a component of the Hadoop Distributed File System ("HDFS"). It can further be appreciated that a distributed file system, like Dell EMC OneFS, can emulate an HDFS environment to provide file services to HDFS clients using the HDFS protocol.

It can be appreciated that because a non-native HDFS operating system can have each node operate as both a NameNode and a DataNode, there is not a single NameNode that acts a gateway to the emulated HDFS environment. In a native HDFS environment, when a client makes a NameNode request for an event, the events can be more easily logged in the order they are processed by the single NameNode without requiring steps to causally order events as the single NameNode is solely responsible for processing and ordering HDFS events. In a non-native HDFS operating system, different nodes can process HDFS operations in parallel and ordering those operations in sequence, as can be required by certain aspects of the HDFS protocol and its associated services, is desirable. Implementations are provided herein to sequentially order HDFS transactions in a non-native HDFS environment where operations are processed by multiple nodes in parallel without a single NameNode acting as a gateway.

In one implementation, a causal ordering is generated that may not be the same as a chronological ordering of events in a non-native HDFS environment. For example, a first operation is the changing the permissions on directory C having a path of /a/b/c. A second operation is changing the owner on File E having a path of /a/b/c/d/e. If you open /a/b/c for changing permissions and then open /a/b/c/d/e before changing permissions on /a/b/c/, and perform the change permissions operations on C before File E has been modified, you may have a causal dependency established that is outside of chronological order. Continuing the example, what if the first transaction was changing the permissions on directory C that would prevent the second transaction from having permission to access File E. Thus, chronologically the first operation was processed first; however, we know that causally the first operation must have happened second because the second operation wouldn't have access to File E if ordered differently. It can be appreciated that in a native HDFS environment, this is not a legal operation. By causally ordering events, events can be reported as they should happen in a native HDFS environment even if chronologically they happen in a different order in a non-native HDFS environment.

Referring to FIG. 1, there is illustrated an example cluster of three nodes logging object version pairs for events performed by the node. Events can be logged at each node among the cluster of nodes operating as a distributed file system. The logs of all the nodes can be aggregated to generate an event transaction log as depicted and described with respect to FIG. 2 below.

Figure 2:
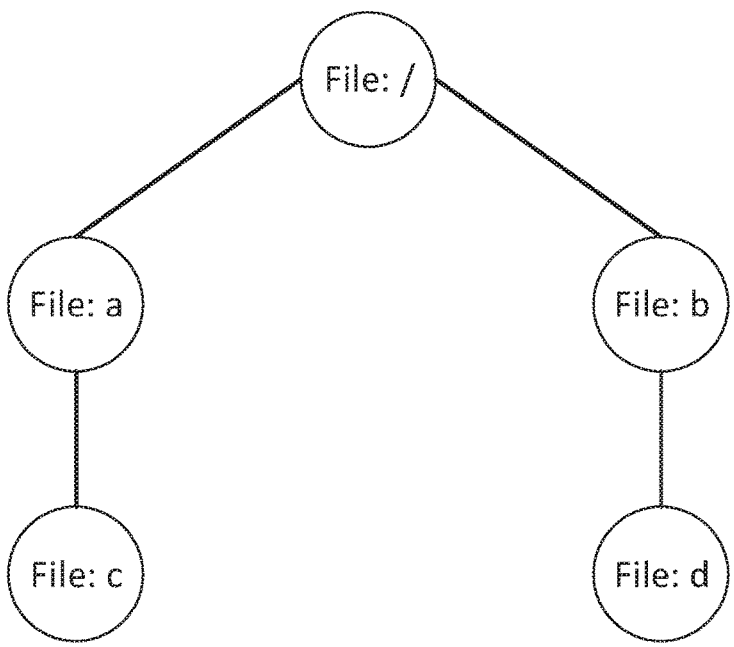
FIG. 2 illustrates an example event transaction log in accordance with implementations of this disclosure.

Referring now to FIG. 2, there is illustrated an example event transaction log in accordance with implementations of this disclosure. Each recorded event can contain a set of viewed inode numbers and revision number pairs, and a set of modified inode numbers and revision number pairs. In one implementation, inode revision numbers can be recorded as "viewed" when an associated inode is associated with a lookup, and a "modified inode" after the inode has been modified. For some events, for example for event 3 as depicted, the event will not be associated with viewed inode and inode revision number pairs. FIG. 2 depicts 5 events logged in the transaction log. The first logged entry is for a rename operation, the second is for a delete operation, the third is for a change modify operation, the fourth is for an append operation, and the fifth is for a create operation. For example, in a create operation, logged as event #5 in the transaction log, the root directory file '/' is a viewed inode and the file for directory 'a' is modified inode as a result of the operation. The root directory file '/' had an inode revision number of 1 at the time of the event and the file 'a' had an inode revision number of 2 at the time of the event. It can be appreciated that the logged event transaction log # does not reflect causal ordering.

Referring now to FIG. 3, there is illustrated an example inode map in accordance with implementations of this disclosure. The inode map maps inode numbers, here labeled as the names of files as depicted in FIG. 2, to maps of revision numbers and event identifiers. It can be appreciated that viewed and modified designations can still be associated with inode numbers and event identifiers. In building the inode map, each event can be iterated through both the view and modified pairs. The current event identifier can be inserted into the set of event identifiers under the key equal to the inode number and then under the key equal to the inode revision number.

Figure 4:
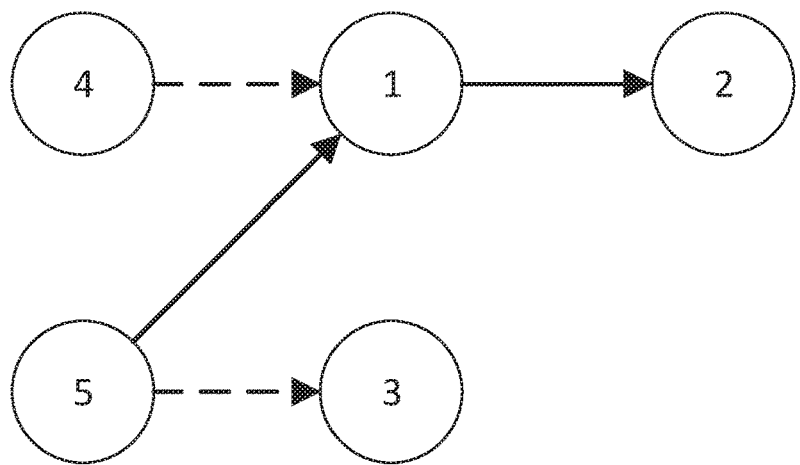
FIG. 4 illustrates example before relationships and after relationships in accordance with implementations of this disclosure.
Figure 4:
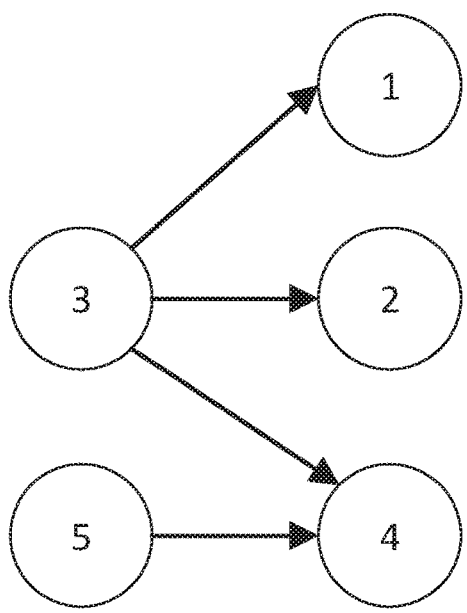

Referring now to FIG. 4, there is illustrated example before relationships and after relationships in accordance with implementations of this disclosure. Each vertex in the graphs represents an event identifier. As depicted in FIGS. 2-3, we have 5 vertices for events 1-5. Each edge in the graph represents a causal relationship. A strong edge, denoted by a solid line from a vertex u to a vertex v means event u must have happened before event v. A weak edge, denoted by a dashed line from a vertex w to a vertex y mean event w likely happened before event y, but it is not guaranteed. To create the directed acyclic graphs, the process can iterate through each event identifier. For each event, iterate only the modified inode number and inode revision number pairs. The before and after causal relationship edges can then be populated.

For each inode number and inode revision pair in the current event's modified inodes, locate the set of inode identifiers with that inode number and the next lowest inode revision number. If another event has an inode at a lower inode revision number, it may have happened before the current event; however, these might be "weak" edges, and causality is not guaranteed for weak edges. For example, ordering events based on their viewed inodes is not guaranteed to be causal as it can be appreciated that viewing inodes on lookup is not atomic to modification. It can be further appreciated that viewed inode revision numbers can be stale by the time of modification.

In the before relationships directed acyclic graph, event 5 viewed the inode '/' with an inode revision number of 1, and event 3 modified '/' with an inode revision number of 2. Because the prior revision number for '/' is a viewed inode revision number, the edge is deemed weak and is denoted by a dashed line from vertex 5 to vertex 3. Similarly event 1 has a modified 'a' inode at revision number 3 and event 4 has viewed 'a' inode at revision number 2. Because the previous revision number for these events is a viewed inode, the edge is a weak edge, as denoted by the dashed arrow line in the before relationships.

Before dependencies can also be strong relationships or strong edges as well. For strong edges, causality is guaranteed. If an earlier event is based on a modified inode number, the before relationship is a strong edge. For example, event 1 modified 'b' inode with an inode revision number of 3 and event 2 modified 'b' inode with an inode revision number of 4, thus a strong edge exists from event 1 to event 2.

For each inode number and inode revision number pair in the current event's modified inodes, locate the set of event identifiers with that inode number and same revision number in the inode map. Draw an edge from the current event's vertex to the vertices of each event in the set. It can be appreciated that if the current event modified this inode, it was the first event to see this inode at this specific revision number. It can be further appreciated that any other event with the same inode and revision number must have occurred after the current event. These can be drawn as strong edges. For example, event 3 modified '/' inode to an inode revision number of 2 and event 4 viewed '/' with an inode revision number of 2, thus a strong edge can be drawn from event 3 to event 4, as event 3 must have occurred before event 4. The after relationships directed acyclic graph in FIG. 4 denotes these strong edges.

Figure 5:
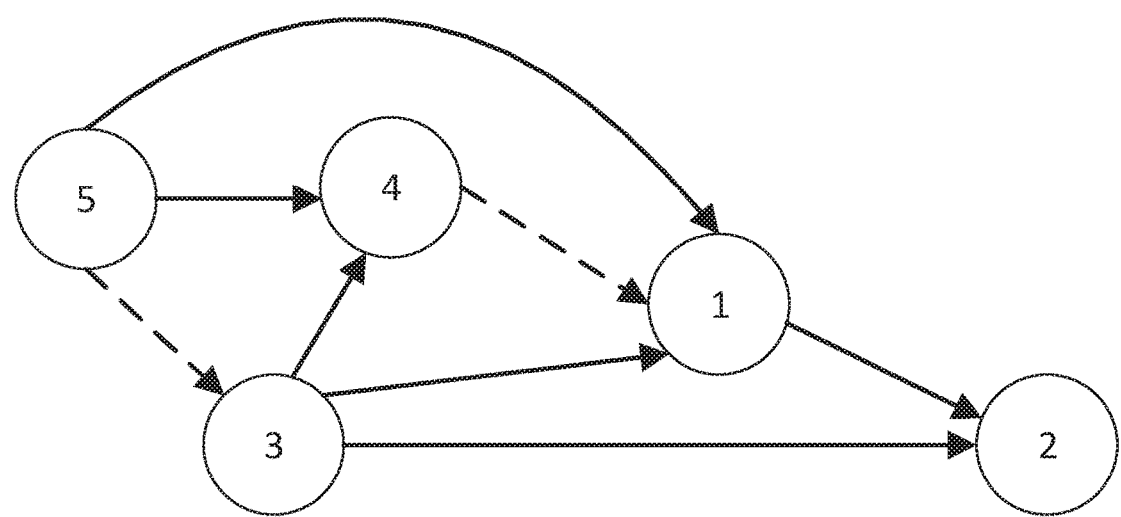
FIG. 5 illustrates an example directed acyclic graph of events in accordance with implementations of this disclosure.

FIG. 5 illustrates an example directed acyclic graph of events in accordance with implementations of this disclosure. The directed acyclic graph in FIG. 5 combines the edges drawn in the before and after relationships in FIG. 4. In the depicted example, the weak edges as drawn do not contradict strong edges in the graph. In one implementation, in response to a strong edge contradicting a weak edge, the weak edge can be removed from the directed acyclic graph. In one implementation, if a strong edge has already been drawn between two vertices and new weak edge is identified that contradicts an existing strong edge, the process can avoid drawing the weak edge. It can be appreciated that by removing contradictory weak edges, causality conflicts can be more efficiently resolved and enable greater accuracy in resolving causal order between events.

In one implementation, when drawing strong edges, more edges can be drawn for inode revision numbers greater than the modified revision number of the event instead of just to the same modified revision number in the case of after relationships. It can be appreciated that this can cause more strong edges to be drawn which may help resolve causal ordering in some cases.

Figure 6:
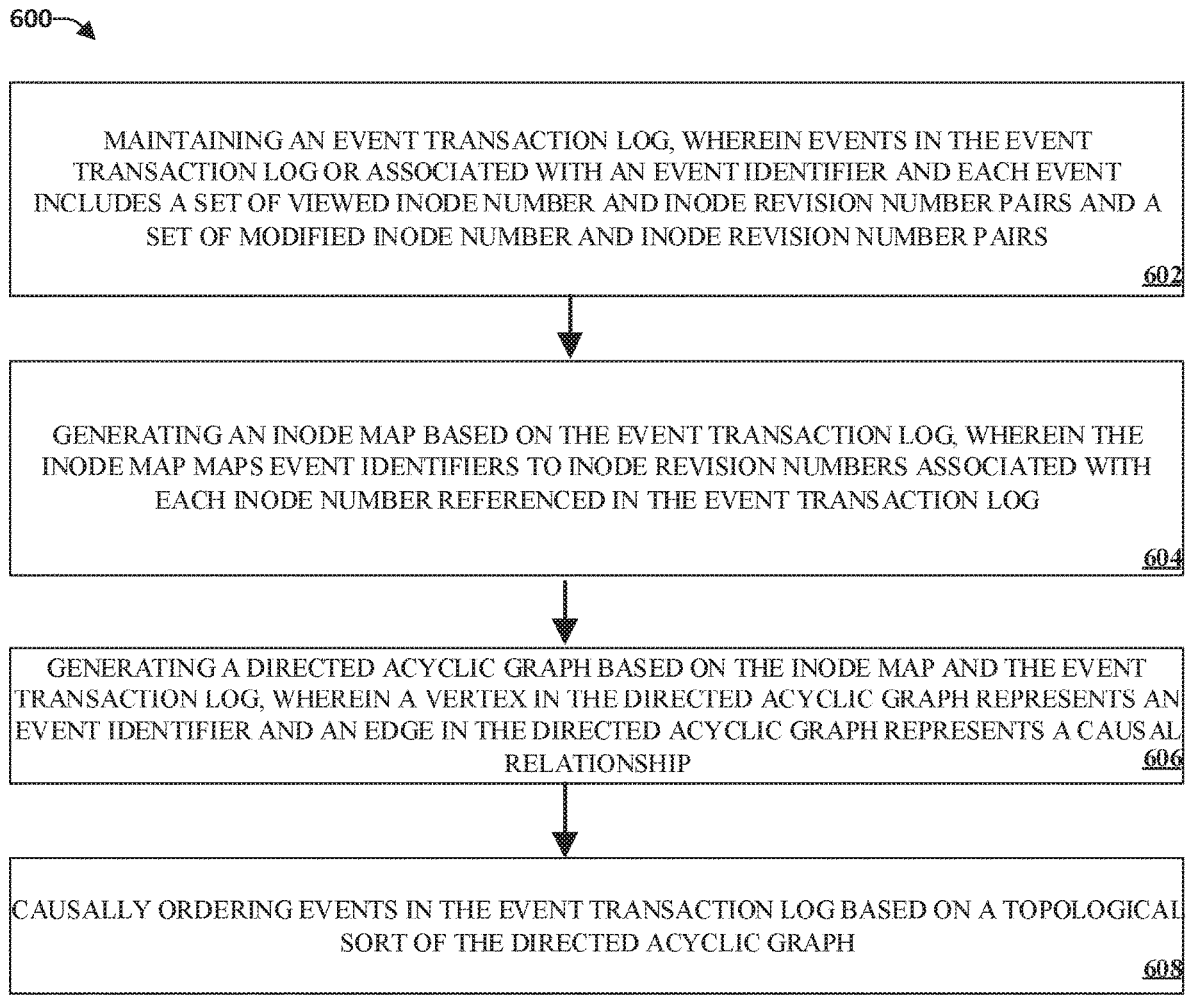
FIG. 6 illustrates an example flow diagram method for causally ordering events in a transaction log in accordance with implementations of this disclosure.
Figure 7:
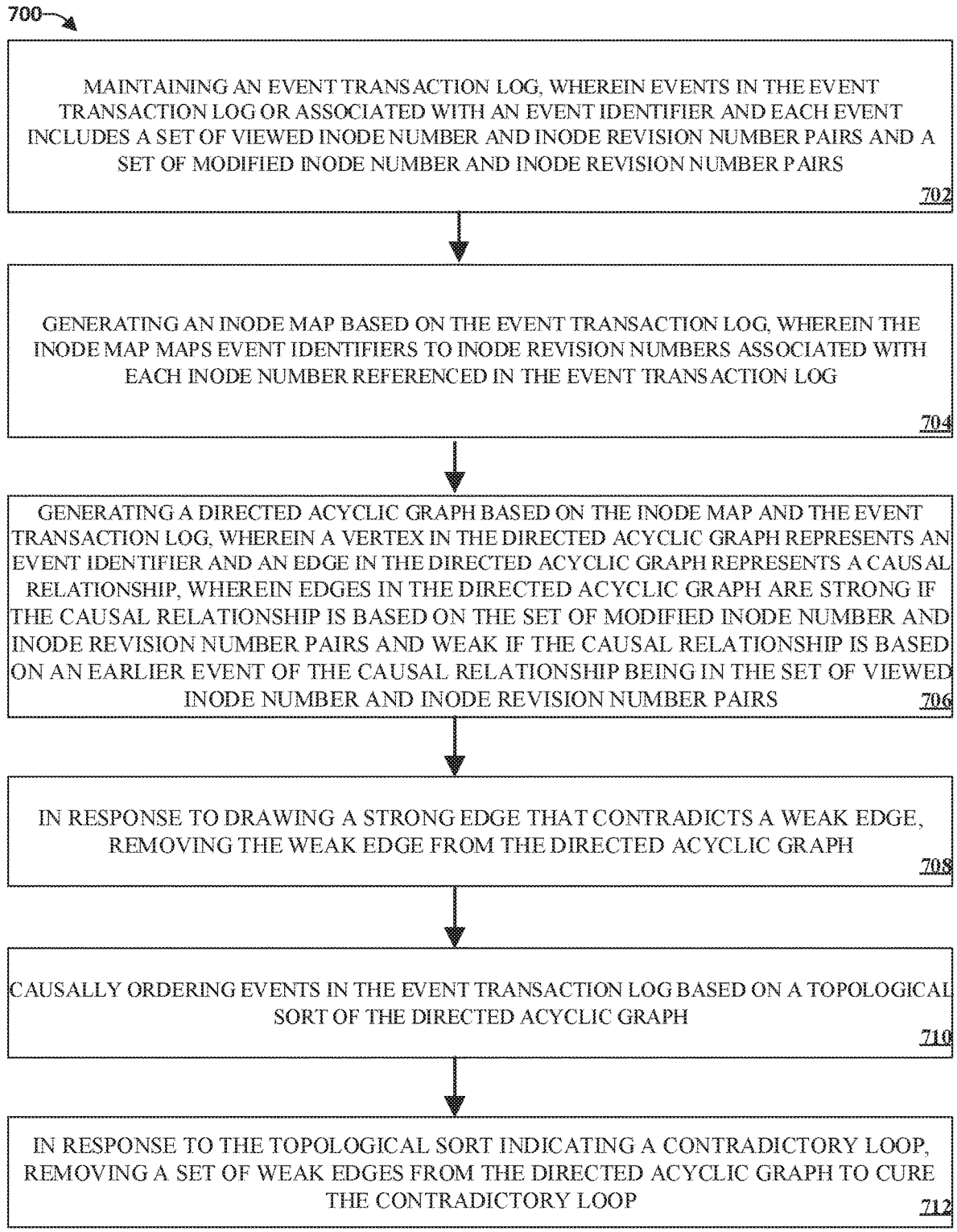
FIG. 7 illustrates an example flow diagram method for causally ordering events, including filtering the directed acyclic graph in accordance with implementations of this disclosure.

FIGS. 6-7 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Referring to FIG. 6, there is illustrated an example flow diagram method for causally ordering events in a transaction log in accordance with implementations of this disclosure.

At 602, an event transaction log can be maintained, wherein events in the event transaction log or associated with an event identifier and each event includes a set of viewed inode number and inode revision number pairs and a set of modified inode number and inode revision number pairs.

At 604, an inode map can be generated based on the event transaction log, wherein the inode map maps event identifiers to inode revision numbers associated with each inode number referenced in the event transaction log.

At 606, a directed acyclic graph can be generated based on the inode map and the event transaction log, wherein a vertex in the directed acyclic graph represents an event identifier and an edge in the directed acyclic graph represents a causal relationship.

At 608, events in the event transaction log can be causally ordered based on a topological sort of the directed acyclic graph.

Referring to FIG. 7, there is illustrated an example flow diagram method for causally ordering events, including filtering the directed acyclic graph in accordance with implementations of this disclosure.

At 702, an event transaction log can be maintained, wherein events in the event transaction log or associated with an event identifier and each event includes a set of viewed inode number and inode revision number pairs and a set of modified inode number and inode revision number pairs.

At 704, an inode map can be generated based on the event transaction log, wherein the inode map maps event identifiers to inode revision numbers associated with each inode number referenced in the event transaction log.

At 706, a directed acyclic graph can be generated based on the inode map and the event transaction log, wherein a vertex in the directed acyclic graph represents an event identifier and an edge in the directed acyclic graph represents a causal relationship, wherein edges in the directed acyclic graph are strong if the causal relationship is based on the set of modified inode number and inode revision number pairs and weak if the causal relationship is based on an earlier event of the causal relationship being in the set of viewed inode number and inode revision number pairs. For example, if the viewed inode number is associated with a later inode revision number than an earlier event, the edge can be strong.

In one implementation, generating the directed acyclic graph includes not drawing a weak edge between two vertices if a strong edge has already been drawn between the two vertices.

In one implementation, a weak edge is converted to a strong edge if an event associated with the view inode number and inode revision number pair is associated with an exclusive lock. It can be appreciated that an event associated with an exclusive lock, even for a viewed inode, guarantees the inode revision number is not stale. For example, an exclusive lock would surround the reading of a viewed inode's inode revision number and the modification event of the target file which is modified, so the viewed inode is effectively fetched atomically with the execution of that operation. In one implementation, viewed inodes that satisfy this criteria can be marked as reliable when logging the vent so it can be distinguished from unreliable viewed inodes.

At 708, in response to a strong edge contradicting a weak edge, the weak edge can be removed from the directed acyclic graph.

At 710, causally ordering event in the event transaction log based on a topological sort of the directed acyclic graph.

At 712, in response to the topological sort indicating a contradictory loop, a set of weak edges can be removed from the directed acyclic graph to cure the contradictory loop. It can be appreciated that weak edges are important and can capture relationships not otherwise apparent without their data point. For example, in one implementation, if a loop has only one weak edge, and otherwise all strong edges, the weak edge can be deemed a false relationship, and can be deleted. The topological sort can then be cycled again, and further contradictory weak edges can be detected and removed, one weak edge per topological sort cycle. In another implementation, all contradictory weak edges can be removed in a single cycle.

Figure 8:
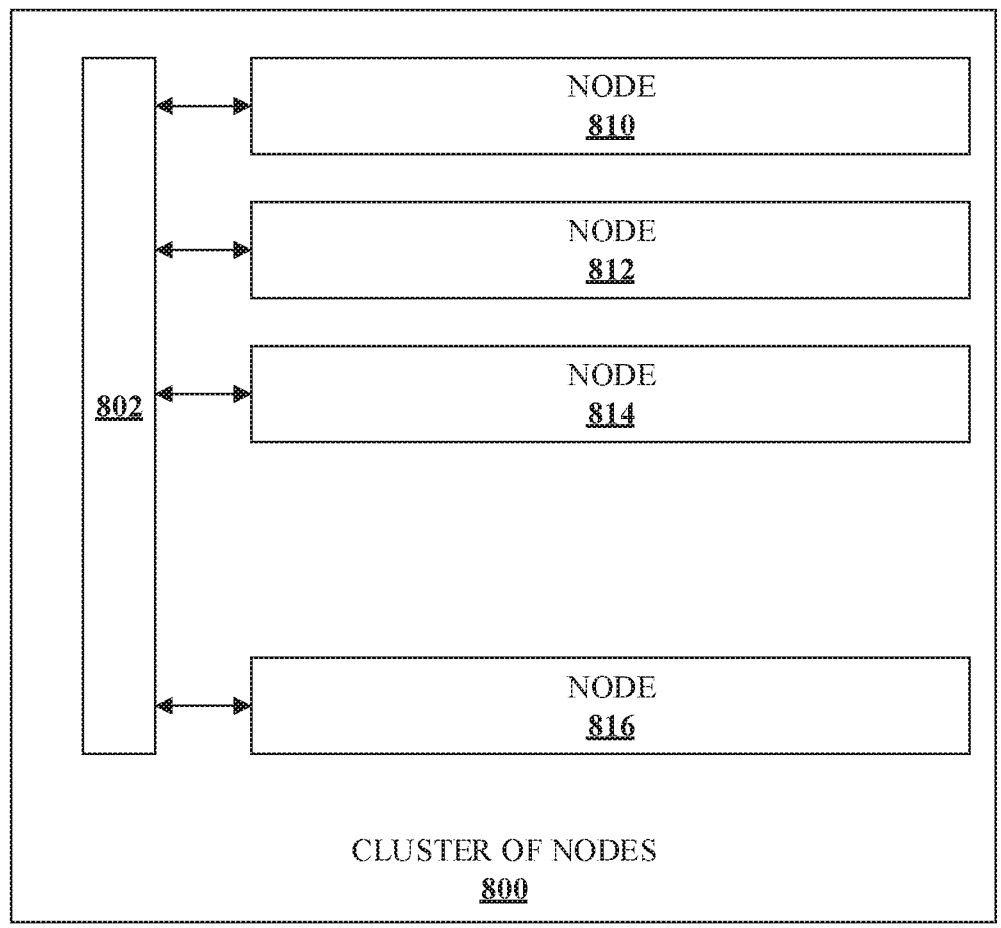
FIG. 8 illustrates an example block diagram of a cluster of nodes in accordance with implementations of this disclosure.

FIG. 8 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, a cluster of nodes typically includes several computers that merely require a network connection and a power cord connection to operate. Each node computer often includes redundant components for power and interfaces. The cluster of nodes 800 as depicted shows Nodes 810, 812, 814 and 816 operating in a cluster; however, it can be appreciated that more or less nodes can make up a cluster. It can be further appreciated that nodes among the cluster of nodes do not have to be in a same enclosure as shown for ease of explanation in FIG. 8, and can be geographically disparate. Backplane 802 can be any type of commercially available networking infrastructure that allows nodes among the cluster of nodes to communicate amongst each other in as close to real time as the networking infrastructure allows. It can be appreciated that the backplane 802 can also have a separate power supply, logic, I/O, etc. as necessary to support communication amongst nodes of the cluster of nodes.

It can be appreciated that the Cluster of Nodes 800 can be in communication with a second Cluster of Nodes and work in conjunction to provide a distributed file system. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 9:
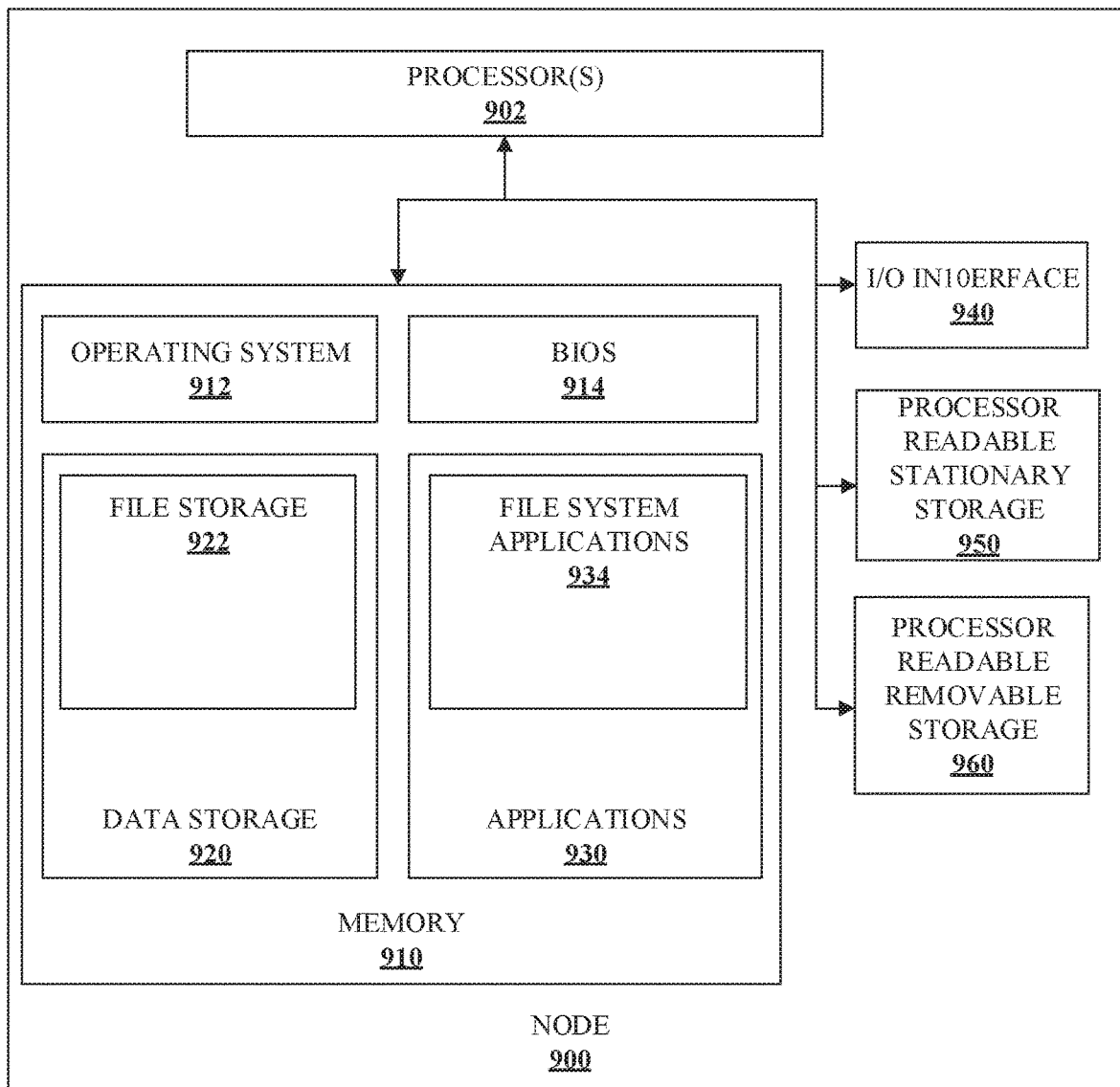
FIG. 9 illustrates an example block diagram of a node in accordance with implementations of this disclosure.

FIG. 9 illustrates an example block diagram of a node 900 in accordance with implementations of this disclosure.

Node 900 includes processor 902 which communicates with memory 910 via a bus. Node 900 also includes input/output interface 940, processor-readable stationary storage device(s) 950, and processor-readable removable storage device(s) 960. Input/output interface 940 can enable node 900 to communicate with other nodes, mobile devices, network devices, and the like. Processor-readable stationary storage device 950 may include one or more devices such as an electromagnetic storage device (hard disk), solid state hard disk (SSD), hybrid of both an SSD and a hard disk, and the like. In some configurations, a node may include many storage devices. Also, processor-readable removable storage device 960 enables processor 902 to read non-transitive storage media for storing and accessing processor-readable instructions, modules, data structures, and other forms of data. The non-transitive storage media may include Flash drives, tape media, floppy media, disc media, and the like.

Memory 910 may include Random Access Memory (RAM), Read-Only Memory (ROM), hybrid of RAM and ROM, and the like. As shown, memory 910 includes operating system 912 and basic input/output system (BIOS) 914 for enabling the operation of node 900. In various embodiments, a general-purpose operating system may be employed such as a version of UNIX, LINUX™, a specialized server operating system such as Microsoft's Windows Server™ and Apple Computer's IoS Server™, or the like.

Applications 930 may include processor executable instructions which, when executed by node 900, transmit, receive, and/or otherwise process messages, audio, video, and enable communication with other networked computing devices. Examples of application programs include database servers, file servers, calendars, transcoders, and so forth. Applications 930 may include, for example, metadata applications, and other file system applications according to implementations of this disclosure.

Human interface components (not pictured), may be remotely associated with node 900, which can enable remote input to and/or output from node 900. For example, information to a display or from a keyboard can be routed through the input/output interface 940 to appropriate peripheral human interface components that are remotely located. Examples of peripheral human interface components include, but are not limited to, an audio interface, a display, keypad, pointing device, touch interface, and the like.

Data storage 920 may reside within memory 910 as well, storing file storage 922 data such as metadata or LIN data. It can be appreciated that LIN data and/or metadata can relate to file storage within processor readable stationary storage 950 and/or processor readable removable storage 960 and/or externally tiered storage locations (not pictured) that are accessible using I/O interface 940. For example, LIN data may be cached in memory 910 for faster or more efficient frequent access versus being stored within processor readable stationary storage 950. In addition, Data storage 920 can also host policy data such as sets of policies applicable to different aspects in accordance with implementations of this disclosure. Index and table data can be stored as files in file storage 922.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method for causally ordering a set of events in a cluster of nodes operating as a distributed file system comprising:

maintaining an event transaction log, wherein events in the event transaction log are associated with an event identifier and each event includes a set of viewed inode number and inode revision number pairs and a set of modified inode number and inode revision number pairs;

generating an inode map based on the event transaction log, wherein the inode map maps event identifiers to inode revision numbers associated with each inode number referenced in the event transaction log;

generating a directed acyclic graph based on the inode map and the event transaction log, wherein a vertex in the directed acyclic graph represents an event identifier and an edge in the directed acyclic graph represents a causal relationship, wherein edges in the directed acyclic graph are strong if the causal relationship is based on the set of modified inode number and inode revision number pairs and weak if the causal relationship is based on an earlier event of the causal relationship being in the set of viewed inode number and inode revision number pairs; and causally ordering events in the event transaction log based on a topological sort of the directed acyclic graph.

2. The method of claim 1 further comprising: in response to drawing a strong edge that contradicts a weak edge, removing the weak edge from the directed acyclic graph.

3. The method of claim 1, wherein generating the directed acyclic graph includes not drawing a weak edge between two vertices if a strong edge has already been drawn between the two vertices.

4. The method of claim 1 further comprising: in response to the topological sort indicating a contradictory loop, removing a weak edge from the directed acyclic graph.

5. The method of claim 1, wherein a weak edge is converted to a strong edge if event associated with the view inode number and inode revision number pair is associated with an exclusive lock.

6. A system comprising at least one storage device and at least one hardware processor configured to:
- maintain an event transaction log, wherein events in the event transaction log are associated with an event identifier and each event includes a set of viewed inode number and inode revision number pairs and a set of modified inode number and inode revision number pairs;
- generate an inode map based on the event transaction log, wherein the inode map maps event identifiers to inode revision numbers associated with each inode number referenced in the event transaction log;
- generate a directed acyclic graph based on the inode map and the event transaction log, wherein a vertex in the directed acyclic graph represents an event identifier and an edge in the directed acyclic graph represents a causal relationship, wherein edges in the directed acyclic graph are strong if the causal relationship is based on the set of modified inode number and inode revision number pairs and weak if the causal relationship is based on an earlier event of the causal relationship being in the set of viewed inode number and inode revision number pairs; and
- causally order events in the event transaction log based on a topological sort of the directed acyclic graph.

7. The system of claim 6, further configured to: in response to drawing a strong edge that contradicts a weak edge, remove the weak edge from the directed acyclic graph.

8. The system of claim 6, wherein generating the directed acyclic graph includes not drawing a weak edge between two vertices if a strong edge has already been drawn between the two vertices.

9. The system of claim 6, further configured to: in response to the topological sort indicating a contradictory loop, remove a weak edge from the directed acyclic graph.

10. The system of claim 6, wherein a weak edge is converted to a strong edge if event associated with the view inode number and inode revision number pair is associated with an exclusive lock.

11. A non-transitory computer readable medium with program instructions stored thereon to perform the following acts:
- maintaining an event transaction log, wherein events in the event transaction log are associated with an event identifier and each event includes a set of viewed inode number and inode revision number pairs and a set of modified inode number and inode revision number pairs;
- generating an inode map based on the event transaction log, wherein the inode map maps event identifiers to inode revision numbers associated with each inode number referenced in the event transaction log;
- generating a directed acyclic graph based on the inode map and the event transaction log, wherein a vertex in the directed acyclic graph represents an event identifier and an edge in the directed acyclic graph represents a causal relationship, wherein edges in the directed acyclic graph are strong if the causal relationship is based on the set of modified inode number and inode revision number pairs and weak if the causal relationship is based on an earlier event of the causal relationship being in the set of viewed inode number and inode revision number pairs; and
- causally ordering events in the event transaction log based on a topological sort of the directed acyclic graph.

12. The non-transitory computer readable medium of claim 11, with program instructions stored thereon to further perform the following acts: in response to drawing a strong edge that contradicts a weak edge, removing the weak edge from the directed acyclic graph.

13. The non-transitory computer readable medium of claim 11, wherein generating the directed acyclic graph includes not drawing a weak edge between two vertices if a strong edge has already been drawn between the two vertices.

14. The non-transitory computer readable medium of claim 11, with program instructions stored thereon to further perform the following acts: in response to the topological sort indicating a contradictory loop, removing a weak edge from the directed acyclic graph.

15. The non-transitory computer readable medium of claim 11, wherein a weak edge is converted to a strong edge if event associated with the view inode number and inode revision number pair is associated with an exclusive lock.

* * * * *